United States Patent Office 3,398,339
Patented Aug. 20, 1968

3,398,339
ELECTRICAL CAPACITORS HAVING INSULATED EXTENDED TABS
Ralph E. Pierpont, Livingston L. Rice, Richard L. Rollins, and Gordon E. Walters, Williamstown, Mass., assignors to Sprague Electric Company, North Adams, Mass., a corporation of Massachusetts
Filed Oct. 19, 1966, Ser. No. 587,703
3 Claims. (Cl. 317—260)

ABSTRACT OF THE DISCLOSURE

Each of a plurality of tabs extending from one end of a rolled capacitor is provided with an insulating member which is placed within the roll between the tab and the capacitor dielectric strip and which extends from the roll with the tab to insulate the extended portion of the tab. The extended insulating material protecting each tab is of sufficient length to overlap at least one other of the extended tabs.

---

The present invention relates to electrical capacitors and more particularly to electrical capacitors of the convolutely wound type having insulated extended tabs.

Wound capacitors are generally provided by metallic and dielectric layers alternately stacked and wound in a rolled configuration. In one type of construction, in which metal tabs are inserted in contact with the electrodes during winding so as to provide terminal connections, the sharp edges of the tabs increase the voltage gradient and cut through or otherwise impair the dielectric at the point of contact.

In the prior art, thin metallic flags are generally secured to the tabs to provide support for them during winding, as well as reduce the tendency of the sharp tab edges to damage the internal portion of the capacitor. Metallic and dielectric tabs provided in the form of a sandwich around the end of the inserted tab have also been proposed. In both cases, however, the flags still provide undesirable sharp edges, and more importantly fail to protect the dielectric at the point where the tab exits from the rolled section; where it is most likely to cut the dielectric due to bending of the extended tab. Furthermore, this construction fails to insulate the extended tabs external to the section.

It is an object of this invention to provide a convolutely wound tab capacitor in which insulative protection is provided within the capacitor section adjacent to the tabs and in the area of the extended tab portions.

It is another object of this invention to provide a rolled capacitor having insulating means in cooperation with the tabs which protects the dielectric within the section and extends above the section to provide insulation for the terminal tabs.

It is a further object of this invention to provide a rolled capacitor having dielectric flags which enhance tab insertion for high speed rolling and provides protection for the dielectric layers of the section as well as for extended tab portions.

These and other objects of the invention will be more apparent upon consideration of the following description taken in conjunction with the drawing in which.

In its broadest scope, a capacitor provided in accordance with the invention comprises a plurality of conducting electrodes and dielectric strips alternately arranged and convolutely wound to form a capacitor section. Tabs are positioned in contact with each electrode within the section and extended therefrom, and insulating means are positioned between each tab and its adjacent dielectric and extend from the section to insulate the extended portions of the tabs.

In one embodiment of the invention, an assembly of the tab and an insulative flag is provided for easy insertion in the winding. The insulative flags are made wide enough as to extend beyond the inserted end of the tab and long enough as to extend transversely along the wound section and to overlap other terminal tabs.

Figure 1:
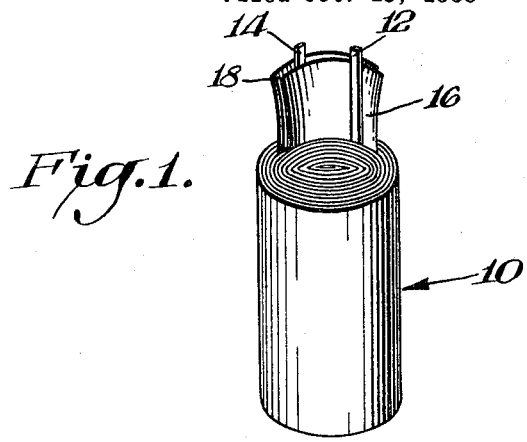
FIGURE 1 is a perspective view of the convolutely wound capacitor incorporating our invention.

Referring now to the figures, in FIGURE 1 a rolled capacitor section 10 is shown having extended tabs 12 and 14 and insulating means 16 and 18. The insulating means, or flags 16 and 18, which may be any suitable insulator such as kraft paper or the like, are extended above the rolled section 10 and transversely along the winding strips, at least partly around the roll, so as to overlap the adjacent terminal tab, thereby insulating external portions of both tabs.

Figure 2:
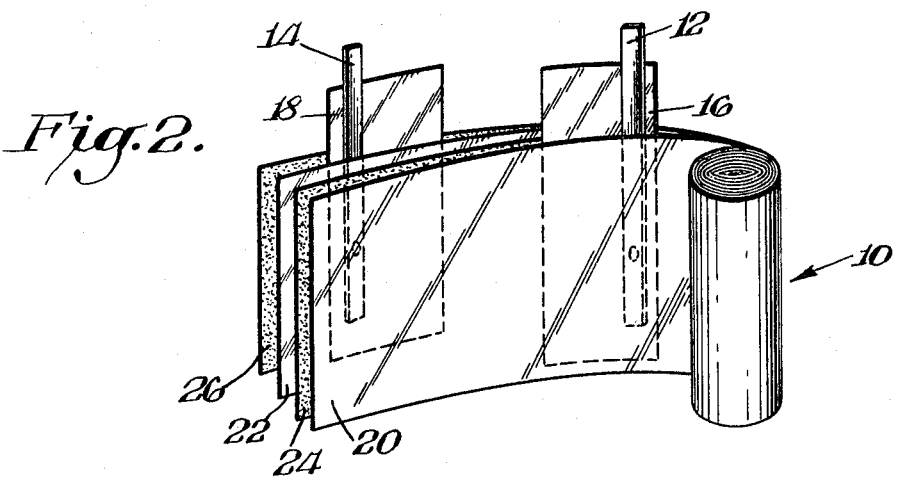
FIGURE 2 is a perspective view of a partially unwound capacitor illustrating a flag-tab arrangement provided in accordance with the invention.

Tabs 12 and 14 are inserted in the roll, as shown in FIGURE 2, in contact with the metal electrodes 20 and 22, and with the insulative flags 16 and 18 positioned between each tab and its adjacent dielectric layer 24 and 26, respectively. As illustrated, each tab-flag assembly provides contact to the electrode and tab insulation, within and external to the section. Thus, tab 12 is provided in contact with electrode 20, with flag 16 spaced between the tab and the adjacent dielectric 24. Similarly, tab 14 is provided in contact with electrode 22 with flag 18 protecting dielectric 26.

The insulating flag in each case is extended above the capacitor section so as to eliminate the need for any additional tab separation paper above the unit or for additional insulation between the tabs and the conventional metal container. The flags also increase the dielectric thickness in the tab area thereby reducing the possibilities of failures due to increased voltage gradient, or cutting of the dielectric within the section and, furthermore, protect the edges of the dielectric, where the tab extends from the section. This is important, since, in conventional construction, bending of the leads often cuts the dielectric at this point; causing shorts to the adjacent electrode.

The insulating flag is extended longitudinally along the layers of the roll so as to allow it to overlap adjacent tabs. Advantageously, it may be allowed to curl around the roll and completely enclose the extended leads, or also extended through the section to provide external insulation at the other end of the rolled section.

Insertion within the section may be accomplished in any number of ways, thus the tab and flag may be separately inserted or as a tab-flag assembly, which was mechanically joined before insertion. The latter construction is generally preferable since it is more suitable to high speed winding.

Figure 3:
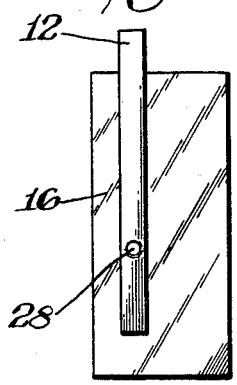
FIGURE 3 is an illustration of a tab-flag assembly provided in accordance with one embodiment of the invention.
Figure 4:
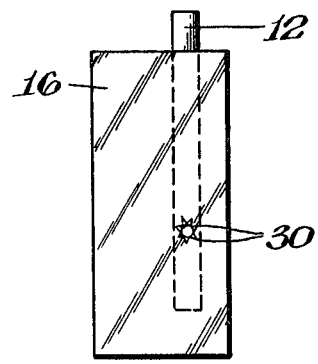
FIGURE 4 is a view of the other side of the tab-flag arrangement of FIGURE 3.

Various means of securing the tab and insulating flag are also possible. For example, as illustrated in FIGURES 3 and 4, the metallic tab 12 may be affixed to the dielectric flag 16 by means of a punched aperture 28, in which portions 30 of the tab are forced through the insulative flag and bent over on its other side to stitch the tab and flag together. Thus the small portions 30, which are punched through and bent over, secure the tab to the flag. Other securing means, such as the use of adhesives are suitable, however, in any case, care must be exercised to avoid contamination of conventional impregnating materials.

The tabs may be assembled to individual flags, as shown, or spaced along and secured in appropriate position to an insulator strip. In the latter case, separate tab-flag assemblies may be cut off before or during insertion in the section. Insertion of the tab-flag assembly is also enhanced in this construction, by the increased tear resistance of the dielectric flag as compared to that of metal flags. The insulative flag also enhances insertion, since it extends along the capacitor section.

As indicated earlier, this flag also protects the dielectric at its extreme edge, where the tab extends beyond the section and at which point bending of the tab generally cuts through, or otherwise damages the dielectric so as to cause shorting between the electrodes. The insertion of the extended insulating means, however, protects the dielectric at this sensitive point while it also provides additional insulation above the section.

Advantageously, the insulative flags may also be utilized to provide a scavaging agent or additive, such as ethynyl cyclohexanol or the like, which absorb or neutralizes, or otherwise reduces undesirable formations within the section; such as, for example, hydrochloric acid. In this regard, the use of a porous insulating flag to provide the additive is quite suitable, since areas adjacent the tab are most susceptible to electrical breakdown.

Many different insulators or dielectrics may be utilized as a flag; for example, kraft paper and other types of non-conductive paper and plastics or the like are satisfactory. The tabs, of course, are made of conventional conductive materials which are suitable for capacitor construction, such as aluminum and the like. Thus many different modifications of the invention are possible, and it should be understood that the invention is not to be limited except as in the appended claims.

What is claimed is:

1. A convolutely wound capacitor comprising a plurality of conducting electrodes and dielectric strips alternately arranged and convolutely wound to provide a capacitor section, a plurality of tabs positioned in contact with said electrodes within said section and extended in spaced relation from one end thereof, insulating means positioned within said section between each of said tabs and the adjacent dielectric so as to increase the dielectric thickness in the tab area, said insulating means extended from said section so as to insulate the extended portion of said tabs, the extended portion of said insulating means of each tab overlapping at least one other of said tabs.

2. A capacitor as claimed in claim 1 wherein said insulating means extends through said section to provide insulation at both ends thereof.

3. A capacitor as claimed in claim 1 wherein said insulating means is porous material impregnated with a scavaging agent concentrated therein.

References Cited
UNITED STATES PATENTS

| 1,393,077 | 10/1921 | Brinton | 317—260 |
| 2,495,734 | 1/1950 | Katzman | 317—260 |
| 2,636,074 | 4/1953 | Ross | 317—259 |

FOREIGN PATENTS

| 270,241 | 6/1927 | Great Britain. |
| 848,440 | 9/1960 | Great Britain. |

LEWIS H. MYERS, *Primary Examiner.*

E. GOLDBERG, *Assistant Examiner.*